Nov. 13, 1934.  E. WILDHABER  1,980,365
METHOD OF PRODUCING GEARS
Filed Sept. 15, 1932  2 Sheets-Sheet 1
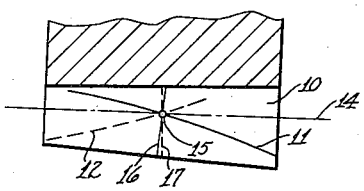
Fig.1
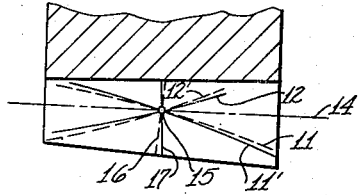
Fig.2
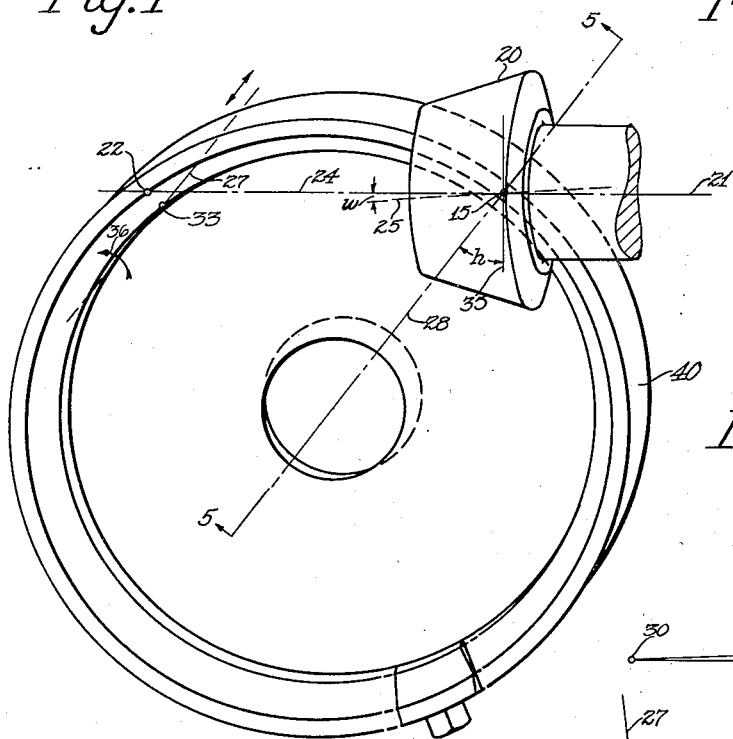
Fig.3
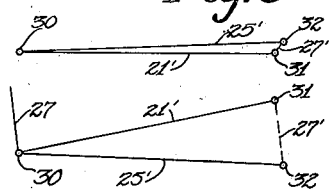
Fig.6
Fig.7
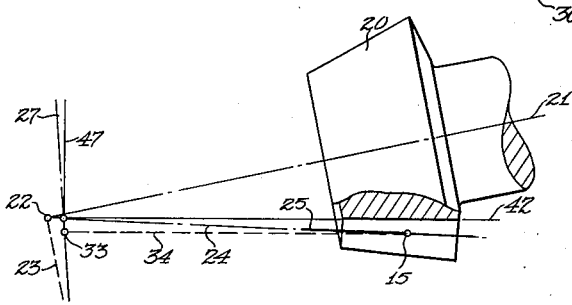
Fig.4
Inventor
Ernest Wildhaber
By B. Schlesinger
Attorney Nov. 13, 1934.  E. WILDHABER  1,980,365
METHOD OF PRODUCING GEARS
Filed Sept. 15, 1932   2 Sheets-Sheet 2

Inventor
Ernest Wildhaber
By
[signature]
Attorney

Patented Nov. 13, 1934

1,980,365

UNITED STATES PATENT OFFICE 1,980,365

METHOD OF PRODUCING GEARS

Ernest Wildhaber, Rochester, N. Y., assignor to Gleason Works, Rochester, N. Y., a corporation of New York Application September 15, 1932, Serial No. 633,247

24 Claims. (Cl. 90—4)

The present invention relates to the production of gears that have teeth which taper in depth from end to end and which are inclined longitudinally to straight generatrices of the pitch surfaces of the gears. The invention relates, therefore, particularly to the production of bevel and hypoid gears having teeth of tapering depth and either skew or longitudinally curved.

Spiral bevel and hypoid gears are almost universally cut with teeth that taper in depth from end to end. To secure the taper in depth, however, the cutting tool is inclined to the blank at such an angle that the tip of the tool travels in a plane which corresponds to the root plane of the gear and which is inclined to the pitch and top surfaces of the gear at the angle necessary to produce the desired taper in depth of the gear teeth. This causes the pressure angle of the tooth produced to change along the length of the tooth. The pressure angle of the tool is chosen with reference to the pressure angle desired to be produced on the gear measured in the pitch plane of the gear, but the tool travels in a direction inclined to the pitch plane of the tooth and inclined, also, to generatrices of the pitch surface of the blank. Therefore, the pressure angle of the tooth will be different at different points along its length when referred to the pitch plane of the gear. Further it will be seen that since the tools which cut mating gears must be oppositely inclined to the common pitch plane of the pair in order to produce cooperating taper in depth of the mating teeth, the pressure angles of the two gears will not match along the length of the mating tooth surfaces. This mismatch of pressure angles along the mating tooth surfaces produces an objectionable tooth bearing condition when the gears are run in mesh. The area of tooth contact extends diagonally of the tooth surfaces and we have so called "bias-bearing".

It is, of course, possible to avoid the condition referred to by use of a cutter having a cutting edge of circular arc profile which in its rotation will sweep out a spherical surface of revolution, because spherical tooth surfaces or tooth surfaces conjugate thereto will match each other in pressure angle regardless of the tilt of the cutter in its movement across the face of the blank. But a tool which has a curved cutting edge is difficult to make and keep accurate. Hence, the cutting of tapered gears with tools of circular arc profile has never come into commercial use.

The present invention is concerned with the production of tapered gears particularly with straight sided cutting tools although it is broadly applicable to the manufacture of gears whose tooth surfaces are other than spherical and are not derived from spherical tooth surfaces. Thus it applies to the production of gears whose tooth surfaces are derived from cylindrical or toroidal surfaces. Its principal use, however, is in the cutting of gears whose tooth surfaces are derived from conical surfaces, for such gears can be cut with a straight-sided tool.

There have been various attempts to eliminate "bias bearing" while still using a straight-sided cutting tool. The most successful of these methods and one which is in general use today is that described in the joint patent of the present inventor and A. H. Candee, No. 1,685,442 of September 25, 1928. In the method of this patent, the gear is usually cut in the standard manner, but the tooth surfaces of the pinion are generated on a cone different from its operating pitch cone, that is, different from the cone which rolls with the pitch cone of the mate gear. Thus, a modification in pressure angle is introduced which compensates for the change in pressure angle resulting from the taper depth method of cutting and so the tooth surfaces of the pinion can be generated to run with those of the gear without "bias". Inasmuch, however, as the change in pressure angle, due to the taper-depth method of cutting, increases on one side of the teeth and decreases on the other side of the teeth measured from the large to the small end of the teeth, it is necessary in order to eliminate bias bearing by the method of this patent on the two sides of the teeth to roll the pinion on two different pitch cones, when cutting opposite sides of the teeth. This means that different settings and different ratios of generating roll must be employed when opposite sides of its teeth are being cut.

The change-over in setting and the requirement for substitution of one set of ratio change gears for another between the cutting of opposite tooth sides of a gear means a slowing-up in production. It is, therefore, the usual practice when employing the method of the above mentioned patent, to finish cut one side of the teeth of the pinion on one machine with a definite pinion-setting and ratio of roll and to cut the opposite sides of the teeth on another machine which has a different adjustment of the work and a different ratio of roll.

The two machine arrangement has, however, its drawbacks also. The blank must be changed from one machine to the other. This means a loss of chucking time and in addition, in practice, it has been found that the two sides of the pinion teeth usually have a varying runout with respect to one another because of the difficulty in positioning the blank on the work spindle of the second machine in exactly the same position that it had on the work spindle of the first machine.

One object of the present invention is to provide a generating motion which will permit of eliminating bias from both sides of the teeth without requiring any change in setting of the blank relative to the tool carrier for cutting opposite sides of the teeth.

A further object of the invention is to provide a generating method which will permit of eliminating bias from both sides of the teeth while employing the same ratio of roll.

Still another object of the invention is to provide a practical and correct method for generating both sides of the teeth of a blank on the same machine while eliminating bias bearing.

The principal object of the invention, however, is to provide a method which will permit both sides of the teeth to be cut simultaneously to correct and accurate shape or to any desired shape, or in other words, to provide a method with which "bias" may be simultaneously eliminated from both sides of the teeth.

The present invention can be employed in cutting one or both members of a gear pair and may be applied to the cutting of gears having widely-varying modifications in pressure angle and tooth profile.

The present invention may be practiced in various ways as will appear hereinafter. In one embodiment, the larger member of the pair is cut according to standard practice, that is, two sides simultaneously and conjugate to a nominal crown gear whose axis passes through the cone apex of the blank. The pinion tooth surfaces are also preferably cut two sides simultaneously but in a generating operation in which the blank rotates on its axis and a helical motion is produced between the tool and blank about another axis inclined to the blank axis. This latter axis may be either offset from or intersecting the blank axis. The helical motion is for the purpose of producing pressure angles of the desired character on the opposite sides of the pinion teeth to obtain full or any desired amount of match of the tooth surfaces of gear and pinion along their lengths. It will be obvious, however, that the same results can be obtained in various ways and that the invention is not restricted to use of a helical motion.

In the drawings:

Figure 1 is a diagrammatic view, showing a side of a tooth of a pinion cut according to the present invention and indicating the lines of contact between the pinion tooth and the mating tooth surfaces of the gear;

Figure 2 is a similar view, indicating diagrammatically the lines of contact between the cutter and the tooth surfaces of the pinion in the cutting of opposite tooth surfaces of the pinion and showing the relationship between these lines of contact and the lines of contact of the gear and pinion tooth surfaces;

Figure 3 is a side view showing diagrammatically the relative positions of cutter and pinion blank in the cutting of a pinion according to the present invention;

Figure 4 is a view of the pinion blank taken at right angles to Figure 3 and further illustrating diagrammatically the principle upon which the settings of cutter and work are determined;

Figures 6 and 7 are diagrammatic views further illustrative of the principles upon which the selection of the cutter position is based.

Figure 5:
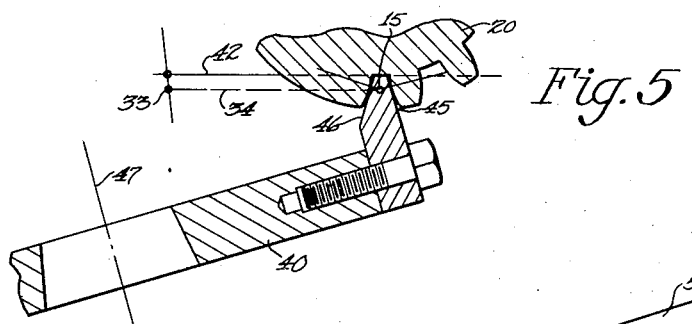
Figure 5 is a fragmentary sectional view taken on the line 5—5 of Figure 3 and showing the cutter and pinion in a plane normal to the pinion teeth.

In Figure 1, 10 designates a tooth of a longitudinally curved tooth pinion generated with teeth of tapering depth and in such manner as to be free of bias bearing when in mesh with its mate gear. When a spiral bevel or hypoid pinion and its mate gear are in mesh, the lines of contact between the concave tooth surface of the pinion and the mating convex tooth surface of the gear extend in some such direction as the direction of the line 11 of Figure 1. Likewise, the lines of contact between the convex tooth surfaces of the pinion teeth and the mating concave surfaces of the gear teeth extend in some such direction as the direction of the line 12 of Figure 1. These lines 11 and 12 extend diagonally of the tooth surfaces because of the lengthwise inclination or spiral angle of the teeth of the mating gears. The lines of contact 11 and 12 for the opposite side tooth surfaces are inclined to one another because of the opposite lengthwise inclination of the teeth of the mating gears.

The lines of contact are not to be confused with area of contact. The lines of contact may lie along lines 11 and 12 and lines parallel thereto, which extend diagonally of the tooth surfaces, but in the aggregate these lines of contact may compose a tooth bearing area or a surface of contact that extends in a direction generally parallel to the common pitch line 14 of the gear and pinion which is the desirable condition, or an area of contact that extends diagonally of the pitch line which is the so-called "bias bearing".

15 designates a mean point in the pitch line 14 of the pinion.

Inasmuch as the teeth of a gear and pinion cut according to the present invention are to have teeth of tapering depth, the axes of the cutters used in the cutting of gear and pinion will be inclined to one another and inclined to the pitch line 14 in accordance with the inclination of the root lines of the teeth of gear and pinion to the common pitch line 14. In Figure 1, the line 16 denotes the line of intersection of a plane passing through the axis of the gear cutter and through the mean point 15 and intersecting the drawing plane. The line 17 designates the intersection line of the drawing plane with the plane containing the axis of the pinion cutter and passing through the mean point 15. The line 16 and 17 are inclined to one another by reason of the taper depth of the two gears.

The present invention involves a new method of pinion generation although the same method may be applied to the gear also. In general, however, it is preferred to cut the gear or larger member of the pair according to standard practice with a ratio of roll so selected that the gear cutter contacts during generation with opposite side tooth surfaces of the gear along lines 11 and 12. The pinion cutter due to the tilt of its axis relative to the axis of the gear cutter will naturally contact then with the tooth surfaces of the pinion blank along lines such as 11' and 12', (Figure 2) which are different from the lines 11 and 12. In order to eliminate bias bearing on opposite side tooth surfaces of the pinion, the lines of contact 11' and 12' between the cutting surfaces of the pinion cutter and the tooth surfaces of the pinion should be inclined at larger angles to the pitch line 14 than are the lines 11 and 12.

As above stated, in the method of Patent No. 1,685,442, bias bearing can be eliminated by cutting the opposite side tooth surfaces of a pinion one at a time and with different settings and different ratios of generating roll. With the use of this method, in other words, it is possible to obtain lines of contact between the opposite side tooth surfaces of the pinion and the cutter which extends along lines 11' and 12'. However, if an attempt were made to employ the method of Patent No. 1,685,442 to cut both sides of the pinion teeth with one setting and one ratio of roll, bias would be eliminated on one side of the teeth, but an exaggerated bias condition would be obtained on the other. A line of contact 11' might be obtained between one side surface of the pinion teeth and the pinion cutter, but the line of contact for the other side tooth surface of the pinion and the pinion cutter would lie along a line inclined to the line 12 and at a smaller angle to the line 11 than the angle between the lines 11 and 12. The reverse would be true if the pinion surfaces were cut so that contact on one side would be along the line 12', for the line of contact on the other side would then be inclined to the line 11 and inclined to the line 12 at a smaller angle than the angle between the lines 11 and 12.

The present invention rests upon the discovery of the existence of motions which will permit the cutting of two side surfaces of the pinion with the same work settings and ratio of roll in such way as to obtain contact between the pinion cutter and the tooth surfaces of the pinion along lines 11' and 12' and produce pressure angles on the two sides of the pinion teeth of a character to provide the type of bearing desired. The present invention, moreover, permits the cutting of the opposite side tooth surfaces of the pinion simultaneously in such manner as to obtain contact simultaneously between the pinion cutter and pinion tooth surfaces along the lines 11' and 12'.

Referring now to Figures 3 to 7 inclusive, 20 denotes a tapered pinion blank which is to be finish cut. The blank has its axis at 21 and its apex at 22. If a bevel pinion is being cut, the axis 23 of the mate gear (Figure 4) will pass through the apex 22 when the gear and pinion are in mesh.

As above stated, the mate gear may be formed according to the method of the present invention or in any other suitable way. In the derivation of the following formulæ it is assumed that the gear has been produced in the conventional manner, conjugate to a nominal crown gear whose axis passes through the apex 22 and whose top plane is tangent to the root cone of the gear. The tooth sides of such a crown gear are conical surfaces whose axes are usually parallel to the axis of said nominal crown gear. It is preferred to produce the gear in the standard or conventional manner since the standard equipment and standard calculations can be employed in manufacturing one member of the pair. In the conventional method of generation, the instantaneous axis of relative motion between the gear and gear cutter passes through the common apex 22 and coincides or nearly coincides with the generatrix 24 of the pitch surfaces of gear and pinion. As is well known, bias occurs when the pinion is generated in a manner similar to the gear, that is, so that the line 24 would again be the instantaneous axis between the pinion blank and the cutter employed to produce the pinion.

In Patent No. 1,685,442, it has been shown that to avoid bias, the pitch line of the pinion should mesh with the pinion cutter and, therefore, with the basic gear which the pinion cutter represents, not along the line 24, but along a line 25 inclined at an angle $w$ to the line 24 (Figure 3) and intersecting the line 24 at the mean pitch point 15. The line 25 is located exactly or nearly in a plane tangent to the pitch cone of the pinion.

It can be demonstrated mathematically that it is impossible to obtain mesh along the line 25 on both sides of the teeth of the pinion through generation of both sides with the same combined motion, when said motion consists of a rotation about the axis 21 of the pinion and of a rotation about any other fixed axis. I have found, however, that there exist other generating motions which may accomplish the desired result. It will now be demonstrated that the result may be obtained by adding a straight translatory motion. More particularly, the result can be achieved in a generating operation comprising rotation of the pinion about its axis 21, rotation about another axis 27 and a simultaneous translation along said other axis. In the embodiment of the invention which will now be described, the said translation is in a constant proportion to the rotation about said other axis. The rotation and translation combine, therefore, to produce a helical motion. Moreover, in this embodiment of the invention, the two motions about the axis 21 and the axis 27 are effected at a constant ratio to each other. Thus the helical motion is of constant lead.

In the embodiment illustrated in Figures 3 to 5 inclusive, it is assumed that the axis 27 is parallel to a plane 28 normal to a tooth surface of the pinion at the mean pitch point 15. Such a plane will contain, of course, the cutter axis. The assumption that the axis 27 is parallel to the normal plane 28 is desirable when the gear or larger member of the pair has been produced according to the conventional method. However, other positions may be assumed for the axis 27 if desired. In any case, the axis 27 of the helical motion may be so determined that no relative motion exists at the point 15 between the blank and the basic gear which the pinion cutter 40 represents. In other words, the helical motion may be so determined that the velocity at point 15 of the member, which the tool 40 represents, is in the same direction and equal to the turning velocity of the blank at the point 15. In the illustrated case, the velocity at the point 15 of the helical motion about the axis 27 equals and coincides with the turning velocity of the pinion blank 20 about its axis 21.

It follows from the laws of kinematics that when the relative motion between the pinion blank and the member, which the tool represents, is as described, then there is a true rolling motion between the pinion blank and the member represented by the tool during generation and that the instantaneous axis of this rolling motion passes through the pitch point 15. Moreover it follows, that if the two sides of the pinion teeth are to be generated conjugate to the same basic member, that the instantaneous axis should then coincide with the line 25.

To determine the relative velocity of the several motions required to effect generation of the pinion, resort may be had to vectorial analysis. The turning velocity about the axis 27, the turning velocity about the axis 21 and the instantaneous turning velocity about the instantaneous axis 25 may be plotted as vectors from a fixed point 30 (Figures 6 and 7). As is known, these turning velocities are so related to one another that they constitute a plane and that each of said turning velocities equals the vectorial addition of the other two. This interrelation enables us to determine the direction of the axis 27 and the rate of turning velocity about said axis when the turning velocity about the axis 21 and the direction of the axis 25 are given.

Figure 6 is a plan view looking in the same direction as Figure 3 while Figure 7 is a front elevational view taken in the same direction as Figure 4. The line 21' is parallel to the blank axis 21 and the distance 30—31 represents the given turning velocity about the axis 21. It may be made unity or an integral number of inches. Line 25' is drawn through point 30 parallel to line 25 whose direction and inclination to the axis 21 will be described in further detail hereinafter.

To obtain the direction of the axis 27, the line 27' is drawn through the point 31 parallel to the normal plane 28. Point 32 is thereby located in the plan view (Figure 6) and by projection is then also located in the front elevation (Figure 7). The axis 27 is parallel to the line 31—32 and the turning velocity about said axis 27 is given by the distance 31—32. The ratio of the distance 30—31 to the distance 31—32 is also the ratio of the turning velocities about axes 21 and 27.

Instead of determining this ratio and the direction of the axis 27 graphically, as described, the desired data may, of course, be obtained also through computation based on the described vectorial addition.

We shall now determine the distance of the axis 27 from the normal plane 28, the lead of the helical motion about said axis and the distance E of the point 33 from the axial plane containing the point 15. The point 33 is the intersection point of axis 27 with a plane 34 passing through point 15 and inclined at the root angle to the blank axis 21.

Let $i$ denote the inclination of the axis 27 with respect to a perpendicular to the drawing plane of Figure 3. Further let $h$ denote the spiral angle of the pinion teeth or the inclination of the normal plane 28 to the peripheral direction 35 at the mean point 15 and let N denote the distance of the axis 27 from the plane 28. L designates the lead of the helical motion about the axis 27.

When the rotation about the axis 27 is in the direction indicated by the arrow 36, helical motion of point 15 consists of a downward component $L. \cos i$ due to the lead, which downward component must be balanced by an equal upward component due to the inclination $i$ of the axis 27 and to the distance N, if there is to be true rolling motion between the blank and the member, which the tool represents, at the point 15. The balancing upward component is equal to $2\pi \sin i.N$ per revolution about axis 27. Hence, on the assumed premise:

$$2\pi \sin i.N = L. \cos i$$

and $$\frac{L}{2\pi} = N. \tan i \qquad (1)$$

Similarly by further using the known methods of kinematics, the velocity of the point 15 in the direction of the circumference of the blank may be put down as:

$$2\pi \frac{N. \cos i}{\cos h} + \frac{L. \sin i}{\cos h} = R.2\pi.A \sin g,$$

where R denotes the ratio of the distance 30—31 to the distance 31—32, A, the mean cone distance of the blank (distance 22—15) and $g$, the pitch cone angle of the blank.

By transformation:

$$\cos i\left(N + \frac{L}{2\pi} \cdot \tan i\right) = R.A. \sin g. \cos h$$

Introducing $$\frac{L}{2\pi} = N. \tan i,$$

from Formula (1), we obtain:

$$\cos i(N + N. \tan^2 i) = \cos i \frac{N}{\cos^2 i} =$$

$$\frac{N}{\cos i} = R.A. \sin g. \cos h$$

and $$N = R.A. \sin g. \cos h. \cos i \qquad (2)$$

Likewise, the distance E may be determined from the requirement that the helical motion at point 15 shall be in the direction of the circumference of the blank.

$$E = \frac{L}{2\pi} \cdot \tan i. \sin h \qquad (3)$$

From the above equations, the helical motion about the axis 27 is completely determinable. While this determination is based on the assumption that at the mean point 15, the blank and the basic member represented by the tool roll upon one another without sliding, a slight amount of sliding may be introduced, if desired, in the production of bevel pinions. When producing hypoid pinions, some sliding is desirable and the amount of sliding should be larger than that for bevel opinions. The determination of the helical motion will then be modified by the amount of sliding which it is desired to produce and the modified data can be determined with the known methods of analysis from the above disclosure.

The angle $w$ between the lines 24 and 25 (Figure 3) may be determined from the disclosure of Patent No. 1,685,442. With $dg$ and $dp$ denoting the dedendum angles of the gear and pinion, respectively, in radians and $r$ the mean cutter radius, the angle $w$ has been determined in said patent as:

$$\tan w = \frac{\tan g}{\cos h}\left[\frac{A}{r}(dg+dp) - \sin h.dg\right].$$

This formula is based upon generation of the pinion conjugate to a true crown gear and, in such cases, of course, the blank is adjusted angularly on the generating machine to its pitch angle. In Figures 3 to 5 inclusive, the blank is shown adjusted to its root angle, that is, with its root angle tangent to the drawing plane of Figure 3. In this latter case, the equation for determining the angle $w$ should be modified as follows:

$$\tan w = (dg+dp)\frac{\tan g}{\cos h}\left[\frac{A}{r} - \sin h\right] \qquad (4)$$

as will be evident from the disclosure of Patent No. 1,685,442.

In principle, the angle $w$ could be determined experimentally by first assuming a particular angle, by then calculating the motions and machine settings and by cutting a pinion with said motions and settings. If the tooth bearings with a pinion so cut are not satisfactory, a slightly different angle $w$ might be assumed, as determined by test of the gear, the motions and machine settings recalculated and the pinion recut.

Ordinarily, the formulas are used in the following order: 4, 2, 1 and 3.

From the preceding description, it will be seen that in order to cut the tooth surfaces of a pinion according to the present invention, a rotary face mill cutter 40 is rotated in engagement with the pinion blank 20, while the blank 20 is rotated on its axis 21 and while simultaneously a helical motion is produced between the cutter and blank about the axis 27. Two side tooth surfaces of the blank may be cut simultaneously or one side may be cut at a time. In the latter event, no change of the blank settings or ratio of roll is required between the cutting of opposite sides of the teeth. The tooth surfaces may be cut in either an intermittent or a continuous indexing operation. In the former case, a cutter of the type shown in the patent to James E. Gleason No. 1,236,834 of August 14, 1917, may be employed, while in the latter case, a cutter such as disclosed in the patent to James E. Gleason et al. No. 1,249,378 of December 11, 1917, would be used.

It will be noted that in the generating method disclosed, the axis 27 is offset from the axis 21 of the pinion blank and the apex 22 of the blank, whereas in ordinary methods of bevel pinion generation, the axis of the generating member intersects the axis of the blank in the blank apex. The amount of offset of the axis 27 from the pinion blank axis 21 is ordinarily, however, very slight for bevel pinions and in many cases, the offset may be eliminated entirely and satisfactory mesh still obtained. This permits of use of a standard spiral bevel gear generator in cutting the pinion as well as the gear. The offset adjustment of the work spindle provided in hypoid machines is not required.

In the method disclosed, it will be noticed further that the axis 27 about which the helical motion takes place is inclined at other than a right angle to the root plane 42 of the blank.

In cutting a pair of hypoid gears, the gear or larger member of the pair may be produced as in the conventional method and the pinion by the present process. In this case, the amount of offset of the pinion for generation is based upon the usual methods of hypoid pinion generation as modified by the settings and motions required by the present invention and determined by the formulas above given.

In practicing the present invention, the cutter diameters of the gear and the pinion are preferably so selected that the same spiral angle is produced on both sides of a tooth space. This ordinarily requires use of a cutter in cutting the pinion which has cutting edges of considerably different pressure angles on opposite sides, as shown in Figure 5. The pressure angle of the side 45 of the cutter 40 is very slight, while the inside cutting edges 46 of the cutter have a comparatively large pressure angle.

The novel method of the present invention may be practiced upon various types of machines. So for instance, the pinion may be generated on a machine of the type described in my Patent No. 1,676,371 of July 10, 1928. The machine settings to be furnished are the settings of the tool and blank with respect to axis 27. These settings can be readily determined from the settings with respect to the drawing planes of Figures 3 and 5.

Ordinarily the axis 47 of the pinion cutter 40 is inclined to the axis 27 of the helical motion. In some cases, however, the cutter axis may be set parallel to the axis of helical motion, particularly when the larger member of the gear pair has a large number of teeth.

Figure 8:
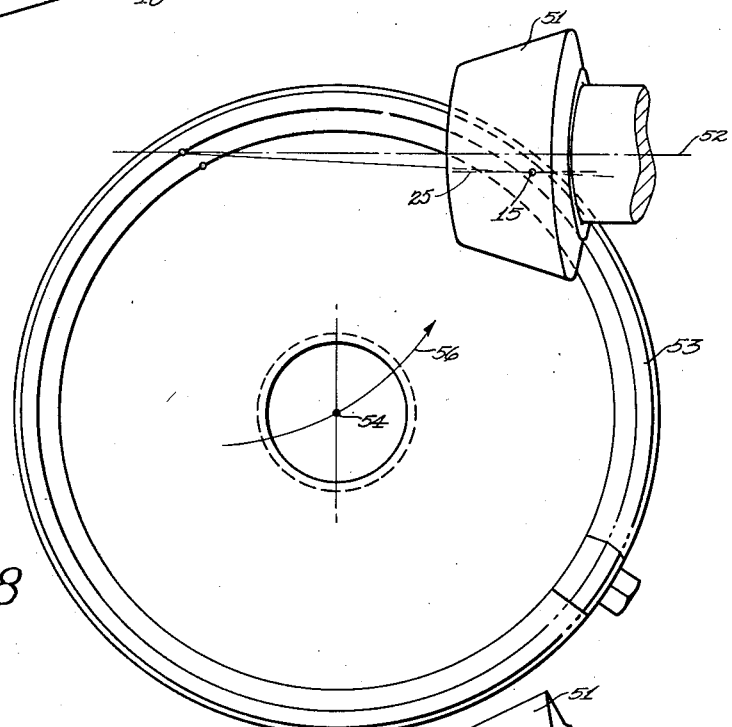
Figures 8 and 9 are a plan view and a side elevation, respectively, illustrating a modified embodiment of the present invention.

This case is illustrated in Figure 8 which is a plan view taken along the axis 50 of the helical motion. The settings and motions may be determined and described with reference to Figures 3 to 5 inclusive. The mean pitch point of the pinion 51 is again designated by the numeral 15 and 25 again denotes the instantaneous axis in the generation of the pinion. As before, generation is effected by rotating the cutter on its axis 54, by turning the blank 51 on its axis 52, by effecting turning motion between the cutter 53 and the blank 51 about the axis 50 in timed relation to the rotation of the blank and by effecting translatory motion between the cutter and blank in the direction of the axis 50 in timed relation to said turning motion.

Figure 9:
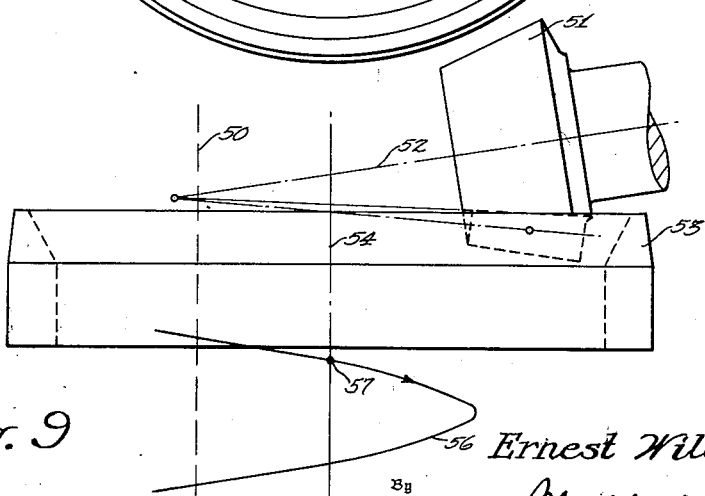

The helical motion may be applied to the blank in addition to its rotary motion, or it may be applied to the tool and the rotary motion only imparted to the blank. In the latter case, the tool performs a helical motion which consists of rotation on the axis 50 and of a translation along said axis and any point 57 on the tool axis 55 then describes a portion of a helix 56 (Figure 9) which appears as a circle in the view of Figure 8.

While the invention has been described particularly with reference to production of gear pairs in which both members are generated, the principles apply equally when the gear is form-cut, that is, non-generated and the pinion alone is generated and the equation for the angle $w$ is simply modified in accordance with the change in method of production of the gear.

Further, while the invention has been described particularly with reference to the cutting of gears with tools of the face mill type and having longitudinally curved teeth, it will be understood that the principles of the invention apply equally where other forms of tools are employed, such as planing tools and worm hobs and also where the teeth are not curved longitudinally but inclined longitudinally, that is, non-radial or skew.

In general, it may be said that while two different embodiments of the invention have been described, the invention is capable of still further modification and that the present application is intended to cover any adaptations, uses, or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of generating a tapered gear which has longitudinally inclined teeth of tapering depth which comprises cutting opposite side tooth surfaces of the gear by moving a pair of side cutting edges across the face of the gear blank so that points in the cutting edges travel in paths inclined to the pitch plane of the blank while rotating the blank on its axis and simultaneously producing an additional relative movement between the respective cutting edges and the blank which is so related to the blank rotation that the side cutting edges will contact, respectively, with opposite side surfaces of the blank during generation along lines inclined to one another at a greater angle than the angle of inclination between the lines of contact of opposite side tooth surfaces of the gear and mating tooth surfaces of a mate gear when the pair are in mesh.

2. The method of generating the tooth surfaces of a tapered gear which has longitudinally inclined teeth of tapering depth which comprises cutting opposite side tooth surfaces of the blank simultaneously by moving a pair of opposite side cutting edges in longitudinally inclined paths across the face of the blank with points in the cutting edges traveling in paths inclined to the pitch surface of the blank, while rotating the blank on its axis and simultaneously producing an additional relative movement between the cutting edges and the blank such that the cutting edges will simultaneously contact with opposite side tooth surfaces of the blank along lines inclined to one another at a greater angle than the angle of inclination between the lines of contact of opposite tooth surfaces of the gear and mating tooth surfaces of a mate gear when the pair are in mesh.

3. The method of generating a tapered gear which comprises positioning a rotary face mill gear cutter, which has side cutting edges for cutting opposite side tooth surfaces of a gear blank, in engagement with a blank so as to cut teeth of tapering depth on the blank, and rotating said cutter in engagement with the blank while rotating the blank on its axis and simultaneously producing an additional relative movement between the cutter and blank such that the opposite side cutting edges will simultaneously contact with opposite side tooth surfaces of the blank along lines inclined to one another at a greater angle than the angle of inclination between the lines of contact of opposite tooth surfaces of the gear and the mating tooth surfaces of a mate gear when a pair are in mesh.

4. The method of producing a bevel gear which has longitudinally inclined teeth of tapering depth, which comprises generating its tooth surfaces by imparting a cutting motion to a tool while rotating the blank on its axis and simultaneously producing a relative helical motion between the tool and blank.

5. The method of producing a bevel gear having longitudinally inclined teeth of tapering depth, which comprises generating its tooth surfaces by operating cutting edges in engagement with the blank to cut a pair of opposite side tooth surfaces simultaneously while rotating the blank on its axis and producing a relative helical motion between the cutting edges and blank.

6. The method of producing a bevel gear which comprises generating its tooth surfaces by rotating a face mill gear cutter in engagement with the blank with the axis of the cutter inclined to the pitch surface of the blank at an angle to produce teeth of tapering depth on the blank while rotating the blank on its axis and simultaneously producing a relative helical motion between the cutter and blank about an axis inclined to the axis of the cutter.

7. The method of producing a bevel gear which comprises generating its tooth surfaces by rotating a face mill gear cutter in engagement with the blank with the axis of the cutter inclined to the pitch surface of the blank at an angle to produce teeth of tapering depth on the blank while rotating the blank on its axis and simultaneously producing a relative helical motion between the cutter and blank about an axis parallel to the cutter axis.

8. The method of producing a bevel gear which comprises generating its tooth surfaces by moving a tool in a longitudinally inclined path across the face of the gear blank with the tip of the tool traveling in a path inclined to the pitch surface of the blank at an angle to produce teeth of tapering depth on the blank and rotating the blank on its axis, producing a relative movement between the tool and blank about an axis angularly disposed to and offset from the blank axis and simultaneously producing a relative movement between the tool and blank in the direction of the last named axis.

9. The method of producing a bevel gear which comprises generating its tooth surfaces by moving a pair of side cutting edges across the face of the blank in paths inclined longitudinally to generatrices of the blank in such manner as to cut two opposite side tooth surfaces of lengthwise tapering depth simultaneously while rotating the blank on its axis and producing relative movements between the cutting edges and blank about an axis angularly disposed to and offset from the blank axis, and simultaneously producing a relative movement between the cutting edges and blank in the direction of the last named axis.

10. The method of generating the tooth surfaces of a tapered gear which has longitudinally inclined teeth of tapering depth, which comprises moving a pair of cutting edges in longitudinally inclined paths across the face of the blank with points in the cutting edges moving along lines inclined at an acute angle to the pitch surface of the blank and rotating the blank on its axis while simultaneously producing a relative helical motion between the tool and blank, the velocities of the blank rotation and of the helical motion being such that a true rolling motion is produced between the blank and tool, during generation, at a mean point of contact between the tool and the tooth surface of the blank being cut thereby.

11. The method of generating the tooth surfaces of a tapered gear which has longitudinally inclined teeth of tapering depth, which comprises cutting two opposite side tooth surfaces of the blank simultaneously with opposite side cutting edges by moving a pair of cutting edges in longitudinally inclined paths across the face of the blank with points on the cutting edges moving along lines inclined at an acute angle to the pitch surface of the blank and rotating the blank on its axis while producing a relative helical motion between the cutting edges and blank, the velocities of the blank rotation and of the helical motion being such that a true rolling motion is produced between the blank and cutting edges, during generation, at a mean point of contact of the cutting edges and opposite side tooth surfaces of the blank being cut thereby.

12. The method of generating the tooth surfaces of a bevel gear which comprises moving a pair of cutting edges across the face of a gear blank in separate concentrically curved paths which are inclined to the pitch surface of the blank to cut opposite side tooth surfaces of lengthwise tapering depth simultaneously, while rotating the blank on its axis and simultaneously producing an additional relative helical motion between the cutting edges and blank.

13. The method of generating the tooth surfaces of a bevel gear which comprises rotating a face mill gear cutter in engagement with a gear blank with its axis inclined at an acute angle to the pitch surface of the blank to cut two opposite side tooth surfaces of lengthwise tapering depth simultaneously while rotating the blank on its axis and simultaneously producing a relative helical motion between the cutter and blank about an axis inclined to the cutter axis.

14. The method of generating the tooth surfaces of a bevel gear which comprises rotating a face mill gear cutter in engagement with a gear blank with its axis inclined at an acute angle to the pitch surface of the blank to cut two opposite side tooth surfaces of lengthwise tapering depth simultaneously while rotating the blank on its axis and simultaneously producing a relative helical motion between the cutter and blank about an axis parallel to the cutter axis.

15. The method of producing a pair of mating tapered gears having teeth of tapering depth which comprises generating the tooth surfaces of one member of the pair by moving a tool in a longitudinally inclined path across the face of a gear blank with the tip of the tool traveling in a path inclined at an acute angle to the pitch surface of the blank, while rotating the blank on its axis and simultaneously producing an additional relative movement between the tool and blank about an axis intersecting the blank axis, and generating the tooth surfaces of the other member of the pair by moving a tool in a longitudinally inclined path across the face of a second gear blank with the tip of the tool traveling in a path inclined at an acute angle to the pitch surface of the blank, while rotating the second blank on its axis and simultaneously producing a relative helical motion between the second tool and second blank about an axis angularly disposed to the axis of the second blank.

16. The method of producing a pair of mating tapered gears having teeth of tapering depth which comprises cutting the tooth surfaces of one member of the pair in a form-cutting process by moving a tool in a longitudinally inclined path across the face of a gear blank with the tip of the tool traveling in a path inclined at an acute angle to the pitch surface of the blank while holding the blank stationary and generating the tooth surfaces of the other member of the pair by moving a tool in a longitudinally inclined path across the face of a second blank with its tip traveling in a path inclined at an acute angle to the pitch surface of the blank and rotating the second blank on its axis while simultaneously producing a relative helical motion between the second tool and second blank about an axis angularly disposed to the axis of the second blank.

17. The method of cutting a bevel gear which comprises positioning a face mill gear cutter in engagement with a gear blank with the axis of the cutter inclined at an acute angle to the axis of the blank and rotating the cutter in engagement with the blank while rotating the blank on its axis and simultaneously producing a relative helical motion between the tool and blank about an axis angularly disposed to and intersecting the blank axis.

18. The method of cutting a bevel gear which comprises positioning a face mill gear cutter having opposite side cutting edges in engagement with a gear blank with the axis of the cutter inclined at an acute angle to the axis of the blank and rotating the cutter in engagement with the blank to cut two side tooth surfaces of the blank simultaneously, while rotating the blank on its axis and simultaneously producing a relative helical motion between the tool and the blank about an axis angularly disposed to and intersecting the blank axis.

19. The method of generating the tooth surfaces of a tapered gear which comprises moving a tool in a longitudinally inclined path across the face of a gear blank with the tip of the tool moving in a path inclined at an acute angle to the pitch surface of the blank, while rotating the blank on its axis and simultaneously producing a relative helical motion between the tool and blank about an axis angularly disposed to and intersecting the blank axis.

20. The method of generating a pair of mating tapered gears which comprises cutting the tooth surfaces of one member of the pair by moving a tool in a longitudinally inclined path across the face of a gear blank with the tip of the tool traveling in a path inclined at an acute angle to the pitch surface of the blank, while rotating the blank on its axis and simultaneously producing a relative rolling motion between the tool and blank about an axis intersecting the blank axis, and cutting the tooth surfaces of the other member of the pair by moving a tool in a longitudinally inclined path across the face of the blank with the tip of the tool traveling in a path inclined at an acute angle to the pitch surface of the blank, while rotating the blank on its axis and simultaneously producing a relative helical motion between the second named tool and the blank about an axis angularly disposed to but offset from the blank axis.

21. The method of generating a pair of mating tapered gears which comprises cutting the tooth surfaces of one member of the pair by moving a tool in a longitudinally inclined path across the face of a gear blank with the tip of the tool traveling in a path inclined at an acute angle to the pitch surface of the blank while rotating the blank on its axis and simultaneously producing a relative rolling motion between the tool and blank about an axis intersecting the blank axis, and cutting the tooth surfaces of the other member of the pair by moving a tool in a longitudinally inclined path across the face of the blank with the tip of the tool traveling in a path inclined at an acute angle to the pitch surface of the blank, by rotating the blank on its axis and simultaneously producing a relative helical motion between the second tool and blank about an axis angularly disposed to and intersecting the blank axis.

22. The method of producing a pair of mating tapered gears which comprises cutting the tooth surfaces of one member of the pair by moving the tool in a longitudinally inclined path across the face of a stationary gear blank with the tip of the tool traveling in a path inclined at an acute angle to the pitch surface of the blank, to produce teeth of tapering depth on the blank, and cutting the tooth surfaces of the other member of the pair by moving a tool in a longitudinally inclined path across the face of a gear blank with the tip of the tool traveling in a path inclined at an acute angle to the pitch surface of the blank to produce teeth of tapering depth on the blank, while rotating the blank on its axis and simultaneously producing a relative helical motion between the second tool and blank about an axis angularly disposed to the axis of the blank.

23. The method of producing a pair of mating tapered gears which comprises cutting the tooth surfaces of one member of the pair by moving a tool in a longitudinally inclined path across the face of a stationary gear blank with the tip of the tool traveling in a path inclined at an acute angle to the pitch surface of the blank to produce teeth of tapering depth on the blank, and cutting the tooth surfaces of the other member of the pair by moving a tool in a longitudinally inclined path across the face of a gear blank with the tip of the tool traveling in a path inclined at an acute angle to the pitch surface of the blank to produce teeth of tapering depth on the second blank, while rotating the second blank on its axis and simultaneously producing a relative helical motion between the second tool and the blank about an axis angularly disposed to but offset from the axis of the second blank.

24. The method of producing a pair of mating tapered gears which comprises cutting the tooth surfaces of one member of the pair by moving a tool in a longitudinally inclined path across the face of a stationary gear blank with the tip of the tool traveling in a path inclined at an acute angle to the pitch surface of the blank to produce teeth of tapering depth on the blank, and cutting the tooth surfaces of the other member of the pair by moving the tool in a longitudinally inclined path across the face of a second gear blank with the tip of the second tool traveling in a path inclined at an acute angle to the pitch surface of the blank to produce teeth of tapering depth on the second blank, while rotating the second blank on its axis and simultaneously producing a relative helical motion between the second tool and blank about an axis angularly disposed to and intersecting the axis of the second blank.

ERNEST WILDHABER.